United States Patent [19]

Frieling et al.

[11] 3,849,227

[45] Nov. 19, 1974

[54] METHOD FOR SCORE SEALING A FOAM PLASTIC CONTAINER

[75] Inventors: Teunis Frieling, Pijnacker; Teunis Ten Bruggencate, Zoetermeer, both of Netherlands

[73] Assignee: Stichting Ontwikkeling Verpakkingsmethoden In De Zuivelindustrie, The Hague, Netherlands

[22] Filed: Apr. 20, 1972

[21] Appl. No.: 245,855

[30] Foreign Application Priority Data

May 13, 1971 Netherlands ...................... 7106615

[52] U.S. Cl. ................................. 156/268, 156/306
[51] Int. Cl. ........................................... B32b 31/00
[58] Field of Search .................... 156/268, 306, 583; 229/51 WB, 48 T, 68 R; 215/1 C

[56] References Cited
UNITED STATES PATENTS

| | | |
|---|---|---|
| 2,343,117 | 2/1944 | Vincent .............................. 156/306 |
| 2,681,296 | 6/1954 | Dobbs et al. ......................... 156/306 |
| 2,743,761 | 5/1956 | Snyder et al. ........................ 156/583 |
| 3,204,760 | 9/1965 | Whiteford .......................... 229/48 T |
| 3,256,527 | 6/1966 | Studen .............................. 229/68 R |
| 3,551,259 | 12/1970 | Schwarzkopf ....................... 156/583 |
| 3,721,360 | 3/1973 | Collie ................................. 215/1 C |

Primary Examiner—Douglas J. Drummond

[57] ABSTRACT

A method for the application of a sealing weld to a container of foam plastic wherein an upright sealing weld is provided, which at the side facing the contents of the containers is provided with a score weld that is tearable and is almost completely protected by the parts of the sealing weld and the container that have remained ductile. The device for the application of the method comprises two heated jaws wherein at least one of the jaws is provided at the lower side with a ridge that protrudes above the inner surface of the jaw. This application also discloses a container provided with at least one sealing weld comprising a score weld according to this method.

6 Claims, 5 Drawing Figures

A METHOD FOR SCORE SEALING A FOAM PLASTIC CONTAINER

BACKGROUND OF THE INVENTION

The invention relates to a method and device for the application of a sealing weld to a container of foam plastic and to a container provided with such a sealing weld.

The application of overlapping welds in foam plastic films or sheets is described in the Netherlands Pat. application No. 69,09,334 laid open for public inspection and in U.S. Pat. No. 3,712,844 issued Jan. 23, 1973. With the aid of the method mentioned in it, from a blank out of a foam plastic, preferably with closed cells and with a density of less than 250 kg/m$^3$ and preferably less than 100 kg/m$^3$, an open container can be manufactured with liquid-tight seams. When this container has been filled with a liquid such as milk, it must be sealed immediately after filling so that the liquid is not lost or contaminated.

By the method described it is possible to apply a sealing weld straightaway but this sealing weld has the drawback that it cannot easily be opened because the foam plastic is ductile everywhere, in the welds, too. When it is tried to tear such a container open by hand, which is sometimes possible at an upright sealing weld, the initial force required for tearing open is found to be rather great so that the container is strongly deformed and the liquid comes under pressure. When eventually the sealing weld tears, the tear suddenly proceeds arbitrarily into the wall of the container, even as far as under the level of liquid, so that a big irregular gap is produced and the liquid flows out uncontrolled.

So as to be able to pour the liquid out under control, a hole is pricked or cut with a knife or a pair of scissors in the wall or a corner of the container. This implies that to open the container an additional appliance always must be used, and that an adequate lip be produced and maintained, so as for household purposes, small portions of liquid can be poured out without spilling.

Now, it is the object of the invention to provide a sealing weld to a container of foam plastic, which meets all the requirements but is constructed such that it contains a weak spot and can easily be opened by hand.

Per se application of weak spots by means of sealed perforations, ribs and tear-off strips in containers for liquids made out of paper or cardboard coated with plastics is know in the art. Upon applying such a weak spot in a foam plastic container one meets with difficulties, however, because the very application of foam is effected in order to obtain a minimum self-weight and a great rigidity and strength. Thus a weakening is remarkably difficult to realize without giving rise to a filled container opening spontaneously on transport because of breaking or tearing under external loads.

From U.S. Pat. No. 3,438,826, for instance, it is known that a sealing weld can be made if two foam layers are clamped and their outer edges are heated with a flame. This produces a brittle bead weld which easily bursts open under a slight load. It is also possible to introduce with a very hot object a brittle line or region by which the foam structure is completely lost. But when the nearest surroundings of such a line or region come under stress, or are suddenly loaded there is a ready chance that this line region bursts open. In these processes, the high temperature of the flame or of the object gives rise to depolymerisation of the foam with the added undesirable possibility of affecting the taste of the liquid.

Still another method is to form a notch in a sealing weld with the aid of one or more knives, but in doing so the location of the notch must be adapted to the previously applied sealing weld and the fact that the knives become blunt or worn gives technological problems to this method in mass production.

SUMMARY OF THE INVENTION

These disadvantages are prevented by the method according to this invention, because on the container at least one upright sealing weld is provided so that, on the side turned to the contents of the container, there is a score weld that is tearable as well as being almost completely protected by the parts of the sealing weld and the container, which adjacent parts have remained ductile and because they have been made by refoaming of the material at and adjacent to the welds. The weak spot is applied within the material of the weld and is surrounded completely, yet it can easily be broken open by hand, without any further devices, by means of an action aimed at opening, while an arbitrary external load or shock during transport does not rupture of the seal.

In order to obtain such a sealing weld according to this invention that can easily be opened by hand, it is necessary that the parameters for manufacturing the sealing weld meet certain requirements that are naturally related to the type of the foam plastic from which the container is manufactured. These parameters are primarily the temperature and the compression at which and the time in which the sealing weld and, simultaneously in it, the score weld are applied. The dimensions of the score weld in relation to the remaining part of the sealing weld are important, too, but these are factors that also depend on the shape of the container and that of the device with which the method is carried into effect.

According to the invention, at least two plane parts of the foam plastic blank out of which the container is manufactured are compressed and heated by welding jaws with a temperature that lies approximately 20°C above the softening temperature of the foam for less than 10 and preferably less than 4 seconds. The sections of the plane parts are compressed to a thickness that amounts to approximately 20 percent of the original thickness of the parts, and the sections that are going to form the score weld are compressed to less than 2 percent of their original thickness by a pressure that is considerably higher than 200 kg/cm$^2$, and with the width of the score being considerably less than the original thickness of the parts.

The temperatures and times are particularly dependent on the nature of the foam plastic used. In the event of polystyrene foam sheet with closed cells and of 2.5 mm thickness, a temperature of 127°C plus or minus 3°C is, for instance, is used for a time of 4 seconds. For thicker material this may increase to 145°C and for thinner material decrease to 120°C, also with adapted times. In the event of foam sheets with closed cells are made out of crosslinked soft polyethylene, the temperature preferably amounts to approximately 127°C plus or minus 1°C and the time up to 4 seconds, and in the event of harder cross-linked polypropylene foam with closed cells a temperature of to approximately 183°C, and the time for welding approximately 8 seconds is used.

The containers in which the sealing weld according to the invention is used are preferably of a prismatic shape with the top or head formed out of flaps folded together after filling, the flaps being pressed against each other in a device according to the invention and welded.

In the process, the device according to the invention comprises two welding jaws, at least one of which at the lower side is provided with a ridge that protrudes for less than 20 percent of the thickness of the sheets to be welded, above the inner surface of the welding jaw, which ridge has a width that is approximately equal to the thickness of one of the sheets of foam plastic to be welded. It is also possible that the two welding jaws are provided with ridges facing each other, in which each protrudes above the inner surfaces for less than 10 percent of the thickness of the sheets to be welded. The welding jaws are heated to a temperature that lies approximately 20°C above the softening temperature of the plastic used.

The height or width of the above-mentioned inner or pressing surfaces of the welding jaws is related to the height or width of the sealing weld on a container. It is of advantage when, for instance, in a transport container the containers are stackable one upon the other so that the head of top of a container can support a bottom of a container placed on top of it without the upright sealing weld collapsing. On account of this consideration a sealing weld is chosen that is low or narrow and preferably not higher or wider than the sum of the thicknesses of the welded and refoamed sheets, and much greater than the thickness of the tearable score weld, which substantially forms the lower part of the sealing weld. If then a vertical load occurs on the sealing weld, the part of the sealing weld that is situated over the score weld will sag beside the score weld and be supported by the parts of the flaps that are situated below the score weld or by the vertical walls of the container that have retained the original thickness and have remained ductile and resilient like the sealing weld. Thus, the vulnerable score weld is not vertically overloaded and does not run a chance of being broken open, but is enveloped by and embedded in the surrounding ductile and resilient foam.

BRIEF DESCRIPTION OF THE VIEWS

The invention is further described below with the aid of a drawing of an embodiment in cross-section and on an enlarged scale of a sealing weld (that can be opened) of a container, of a set of welding jaws of a welding device used in the process, and of embodiments of containers in perspective with such sealing welds according to the invention.

The above mentioned and other features, objects and advantages, and a manner of obtaining them are described more specifically below by reference to embodiments of this invention shown in the accompanying drawings, wherein.

Figure 2:
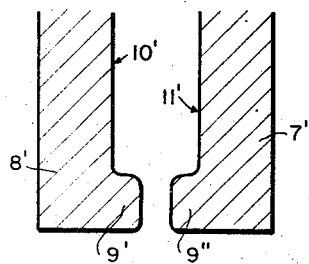
FIG. 2 shows an enlarged cross-section of welding jaws used in the process for forming the weld shown in FIG. 1.
Figure 2:
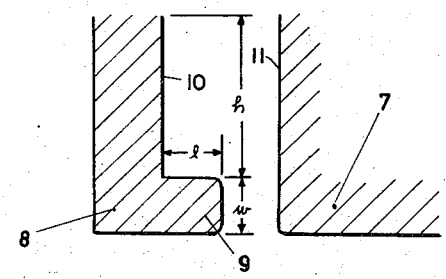
Figure 3:
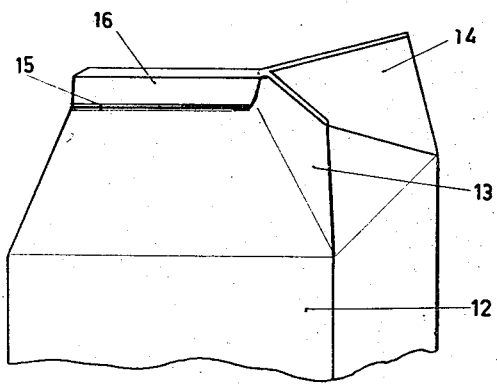
Figure 4:
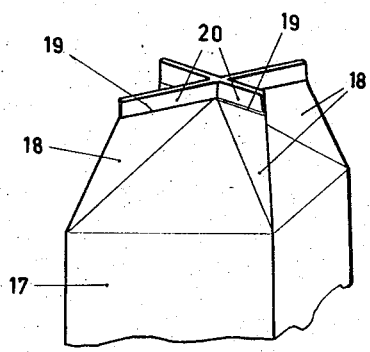

FIG. 2' shows another embodiment of the welding jaws as shown in FIG. 2;

FIG. 3 shows in perspective a shape of the head or top of one embodiment of a container with a Y-shaped sealing weld; and FIG. 4 shows in perspective a shape of the head or top of another embodiment of a container with an X-shaped sealing weld.

DETAILED DESCRIPTION OF PREFERRED EMBODIMENTS

I The Welds

Figure 1:
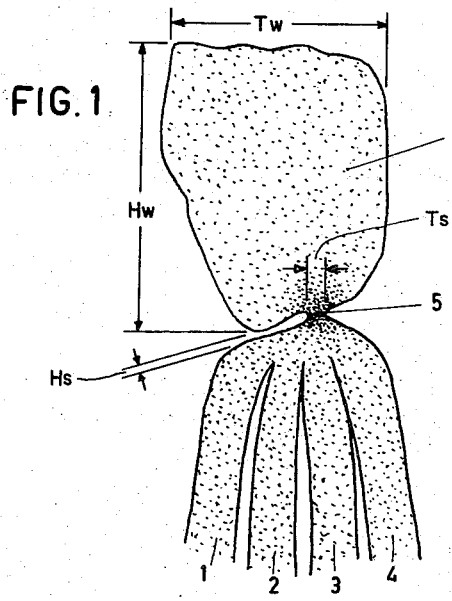
FIG. 1 shows an enlarged cross-section of a sealing weld for four layers of foam plastic.

In FIG. 1 four sheets 1, 2, 3 and 4 of polystyrene foam plastic are shown each with a thickness of approximately 2.5 mm and a density of approximately 40 kg/m$^3$. These sheets are welded together with the aid of heated welding jaws of a welding device according to FIG. 2. With the aid of these jaws a constricted part 5 of the sheets is obtained with over it a protruding part 6. Both over and somewhat under part 5, the sheets are welded together without a transition between the sheets being visible.

Part 5 has been so compressed during welding that a pre-determined tearability has arisen in a place that surprisingly has been found not to be vulnerable. The thickness $Ts$ and the width or height $Hs$ of part 5 are very small in relation to the original thickness of the sheets. Because after the compression of part 6, which compression was far less than of part 5, the part 6 refoams so that the parts above and below part 5 come towards each other, and embed part 5, which has been refoamed too. Through this refoaming process, the sealing weld for the greater part retains the resilience of the original foam, but in welding the sheets are fused together into one whole. When part 6 is snatched away laterally by force, part 5 tears and the connection between the sheets right under part 5 is broken. Bending part 6 hither and tither with part 5 as the folding line does not immediately result, however, in the weld tearing open on part 5, because the foam over and under part 5 yields, and tearable part 5 is protected between the enveloping foam. This part 5 lies without stress along a neutral line.

Preferably the height or width $Hs$ of part 6 will not be chosen great with respect to the total thickness of the refoamed welded sheets, and preferably equal to or not much greater than the sum of the original sheet 1, 2, 3, or 4 thicknesses. In the event of greater heights $Hs$ of part 6 and large vertical flaps under part 5, kinks might be occur whereupon the score weld 5 might be particularly heavy loaded and unintentionally collapse under the load of a weight resting on top of part 6. With regard to this problem, however, the way in which the sealing weld 5 is provided on the top of a container and particularly in what geometrical shape the head or top of a container is brought, also plays a part. In discussing FIGS. 3 and 4, reference will be made to this.

II The Process and Apparatus

In order to apply a sealing weld according to FIG. 1 to a number of foam plastic sheets, use is made of a heating and compressing device with a welding jaw construction, for instance, according to FIG. 2. This construction comprises two heated jaws 7 and 8 between which the sealing weld is formed.

The jaws are heated to approximately 20°C above the softening point of the foam plastic and, in the example drawn, one of the jaws bears an upright ridge 9. Ridge 9 has rounded corners in order not to introduce cracks in the foam sheet lying against the ridge when the compression of the sheets is effected. Further, the welding jaws have flat surfaces 10 and 11, facing each other. For the manufacture of a sealing weld, the jaws with the foam plastic sheets inserted in between them are moved towards each other so that these are compressed to approximately 20 percent of their original thickness, except on the location of ridge 9. Compression there can be effected until the end of the force of the compression device, whereupon the sheets are compressed to less than 2 percent of their original thickness, and the specific surface pressure on the sheets runs up to far over 200 kg per cm². There is a relation between the dimension with which ridge 9 protrudes 1 above surface 10 and the thickness of the foam sheets to be welded. Generally, it may be posed that this must amount to less than 20 percent and approximately 18 percent of the sum of the sheet thicknesses. The height $w$ of ridge 9 is generally chosen equal to or smaller than the thickness of one foam sheet, whereas the height $h$ of surfaces 10 and 11 amounts to more than the sum of all (four) of the sheet thicknesses to be welded together.

The phenomenon occurs that, though only one of the jaws bears a ridge 9, at the end of the process, when the sheets that are being welded together are released after they have been compressed for e.g., 4 seconds, part 6 refoams to the original thickness $Tw$ of the sheets and refoams also downwards whereupon pre-determinedly tearable part 5 comes to lie substantially in the centre of the bundle of sheets. This, naturally, can be improved when each jaw 7' and 8' is provided with a ridge 9' and 9' as shown in FIG. 2', these ridges thus each protruding less than 10 percent beyond their surfaces 10' or 11' lying above them.

The temperature at which the jaws 7 and 8 or 7' and 8' are heated lies above the softening temperature of the foam plastic, but the period of time at which the jaws remain pressed together is relatively short and must not be so long that the foam reaches temperatures at which it loses its foamy character and will be found to be no longer able to refoam. Preferably a time of 2 to 10 seconds is chosen.

At ridge 9 or ridges 9' and 9", probably such a compression of the air in the cells of the foam takes place that in the planes of the sheets that are turned towards each other, a higher temperature occurs so that the desired tearability is obtained and part 5 of the weld becomes a score weld tearable along the desired line thereof.

III The Products

In FIG. 3 one shape of a head of a container 12 is shown which has been made out of one folded or welded sheet of foam plastic. The head of this container consists of flaps that are folded towards each other according to a Y-pattern. In folded parts 13 and 14, only two sheet thicknesses are combined and a sealing weld is made without a score weld. In the leg of the "Y," four layers of the foam sheets are brought together and in them a sealing score weld according to the invention is made, with line or crease 15 representing the score weld 5 of FIG. 1 and above it a sealing weld vertical part 16 that corresponds to part 6 of FIG. 1. With this construction, a Y-shaped top bearing surface is obtained on to which a subsequent container 12 can be stacked. Because part 16 is low with respect to the thickness (FIG. 1 shows the desired proportional dimensions), the vertical load of another full container standing upon it does not cause part 16 to kink. On the other hand, this part 16 constitutes a particularly adequate grip for tearing off this strip part 16 laterally along score weld 15. As soon as strip 16 has been removed, only a nipping movement in the head of the container is required so as to rupture the last remains of connection between the four sheets, such as is drawn in FIG. 1 below score 5 in order to open the container.

In the construction according to FIG. 4, a different kind of head is folded on to a container 17, with a cross-shaped or X-shaped pattern functioning as a bearing surface for a container that stands on top of it. Here, the folded parts are brought together to form upright planes or wings 18, and at their upper sides or ends they are sealed by a sealing weld. In all four planes or wings, sealing and score welds according to the invention can be provided, but it is recommendable to do so only in two planes or wings, with thick lines or grooves 19 being the score welds corresponding to part 5 of FIG. 1. By tearing off parts or strips 20 that correspond to part 6, this container 17 is easily opened, too. Attention is drawn, however, to the fact that here only two layers are welded one upon the other, and the embedding effect at score welds 19 or 5 of FIG. 1, occurs to a lesser extent than for score weld 15. In this case the ridge or ridges 9 or 9' and 9" of the welding jaws now protrude above their surfaces 10 or 10' and 11' less than 20 percent of the thickness of two foam layers.

Because a grip for tearing strips 20 over score welds 19 is necessary so as to be able to pull it loose, these strips 20 will have a height of somewhat more than the thickness of the two foam sheets, namely about 5 mm. or more, if the initial foam sheet thickness is 2.5 mm. The vertical kink load is also lower, however, because of the cross-shaped bearing pattern chosen in this FIG. 4.

IV Examples

As an example four polystyrene foam sheets out of Aphrolan*R of Delta Plastic G.m.b.H and Co. K.G. with a thickness of 2.5 mm. were compressed for 4 seconds with the aid of a welding jaw construction according to FIG. 2. With it trial welds were made at welding jaw temperatures varying from 125°C to 145°C at a compression at the location of ridge 9 above 200 kg/cm² and much higher, and the distance to opposite jaw 7 was varied from substantially 0.5 mm. to 0.01 mm. It was found that the best results were obtained at a compression of 0.1 to 0.2 mm., or about 2 percent of the original thickness, and at a jaw temperature of approximately 127°C. If higher temperatures are applied, the temperature increases too much in part 5 and a change of quality takes place over a larger section than in part 5, with this section 5 becoming so brittle that it no longer refoams sufficiently. With these foam sheets it was found that the ideal score thickness $Ts$ of part 5 was less than 1.2 mm. After completion of the process, whereas a thickness below 0.1 mm. was too weak, and a thickness much over 1.2 mm. did not give the desired tearability.

When a container is formed out of these sheets, a compression at a sealing weld of four sheets to 2 percent at ridge 9, so to produce a thickness of 0.2 mm., was found to be most desirable. The height or width $w$ of ridge 9 was chosen to be approximately equal to the thickness of the individual sheets, which in this case was 2.5 mm. This does not mean, however, that the height or width Hs of score weld 5 remains at 2.5 mm., but surprisingly this height becomes considerably less in the completed weld. This originated mainly from the fact that the parts of the foam sheets that have not partaken in the compression to the lower percentages and only have been welded together in the foamy condition, refoam also in a vertical direction, after jaws 7 and 8 have been released, and embed the score weld 5. This is clearly shown at the left-hand side of score weld 5 in FIG. 1, whereas at the right-hand side at sheet 4, which was turned towards smooth surface 11 of jaw 7, there is a V-shaped slot nearly symmetrical with respect to the entire weld.

With other materials, too, a sealing weld according to the invention was made. For instance, four sheets of 2.5 mm thickness made out of crosslinked soft polyethylene with closed cells and having a density of approximately 45 kg/m$^3$ and a degree of crosslinking at which 18.6 percent in weight is dissolvable in boiling xylene, were welded together in a welding jaw construction according to FIG. 2. The temperature of the welding jaws was kept at 127°C plus or minus 1° and the closing time was 4 seconds. Again different openings between ridge 9 and surface 11 were used, varying between 0.05 mm and 0.4 mm. After welding, the material refoamed at score weld 5, and the best tearability was obtained when the opening was kept smaller than 0.2 mm, corresponding to a compression of approximately 2 percent. This weld 5 could easily be pulled loose by laterally snatching away part 6 in spite of the fact that the thickness Ts of the completed score weld 5 amounted to approximately 3.8 mm. plus or minus 0.2 mm.

In a design with two sheets of a foam out of cross-linked polypropylene with closed cells of make Haveg Minicel-PPF type 5B-1 having a thickness of 2 mm. a density of approximately 70 kg/m$^3$, and a degree of cross-linking of 32.7 percent dissolvability in boiling xylene, a number of welds was also made. Welding jaws according to FIG. 2 were applied with the ridge 9 protruding beyond surface 10 over a distance 1 of 0.3 mm, corresponding to less than 10 percent of the sum of the sheet thicknesses. The temperature of the welding jaws amounted to 183°C plus or minus 1°C, and an opening of 0.05 mm at ridge 9 was used. The total closing capacity of the press was plus or minus 7,000 kgs. In order to attain a satisfactory result, the welding time in this process was much longer, however, and had to be chosen in the order of about magnitude of 8 seconds. Then an adequately tearable closure was obtained with a thickness of Ts at the score weld 5 of approximately 1 mm.

It is clear that other foam plastics with other thicknesses can be welded with a sealing weld that at the same time contains a score weld, by appropriate protruding welding jaw ridges 9 or 9' and 9'', but the plastics must be thermoplastic and should be weldable without extra devices except heat and pressure. As an example, there may be used to polymers and copolymers made monomers with the general formula $CH_2=C_Y{}^X$, wherein X may be H or $CH_3$, and Y may be, H, Cl, $C_6H_5$, COOH, $COOCH_3CN$, $O.CO.CH_3$ or $C_2H_5$. In the copolymer, a diolefine may be built, while modifications and mixtures of these polymers also can be used, including for example; polystyrene, polystyrene-rubber compositions (impact-proof polystyrene), polyvinylchloride, copolymers of vinyl compounds, polyolefines such as polyethylene, polypropylene and their copolymers, whether or not in cross-linked form, and acrylonitrile-butadiene-styrene compositions. Foam plastic films and foam plastic sheets of polymerisation product with hetero-atomic chains are eligible, too, as polyoxymethylene, polyethylene-oxide, propylene-oxide, and nylon 6 (out of caprolactam). Polycondensates and polyaddition products with rearrangements such as polyurethane foam, produce very particular difficulties, however.

The containers manufactured from one of the said foam plastics are chiefly used for filling with measured quantities of liquid; primarily, liquids such as milk or dairy products, and in a wider sense liquids suitable for human consumption, wherein the requirements for guaranteeing the purity of the liquid and for the liquid not being affected by ingredients of the foam plastic, play a large role during or after welding. Other substances, too, can be stored in such containers with the nature of the foam being determined by the fact that these substances must not react with the foam or the plasticizers, stabilizers, blowing agents, or dyestuffs in it, in such a way that the quality of the stored substances is affected.

While there is described above the principles of this invention in connection with specific apparatus and products, it is to be clearly understood that this description is made only by way of example and not as a limitation to the scope of the process of this invention.

We claim:

1. A method for the application of a sealing weld to a container of foam plastic sheet with a density of less than 250 kg/m$^3$, comprising:
   A. overlapping the parts of the foam plastic to be welded,
   B. seal welding said overlapped parts together by means of pressure that compresses the welded parts to between about 10 percent and 20 percent of their original thickness at a temperature approximately 20°C above the softening point of the plastic for a time of less than about 10 seconds without the foamy character of the weld being lost, and
   C. simultaneously welding a score weld adjacent and along said seal weld and that is tearable, and is formed by compressing said parts to a thickness less than 2 percent of the original thickness of said overlapped parts at a pressure that is considerably higher than 200 kg/cm$^2$ so that said score weld is almost completely surrounded or bridged and protected by the refoaming of the adjacent parts of the sealing weld and the container that have remained ductile, thereby preventing unintentioned collapse of the score weld by loading.

2. A method according to claim 1, wherein said foam sheet is of polystyrene and said temperature is applied between about 120°C and 145°C for a time between 2 and 10 seconds.

3. A method according to claim 2, wherein said temperature is 127°C plus or minus 3°C and said time is approximately 4 seconds for a sheet thickness of approximately 2.5 mm.

4. A method according to claim 1, wherein, said foam sheet is of polyethylene and said temperature is applied at 127°C plus or minus 1°C for a time of 4 seconds for a sheet thickness of 2.5 mm.

5. A method according to claim 1, wherein said foam sheet is polyropylene having a density of approximately 70 kg/m³, and said temperature is applied at 183°C plus or minus 1°C, for a time of approximately 8 seconds for a sheet thickness of 2mm.

6. A method according to claim 1 wherein the width of the score becomes considerably less than the original thickness of the parts, and the score weld comes to lie approximately in the center of the welded bundle of parts.

* * * * *